(12) United States Patent
Cantrell et al.

(10) Patent No.: US 10,582,718 B2
(45) Date of Patent: Mar. 10, 2020

(54) DEFROST APPARATUS AND METHOD THEREOF

(71) Applicant: UNIFIED BRANDS, INC., Jackson, MS (US)

(72) Inventors: John W. Cantrell, San Antonio, TX (US); Mark Churchill, Grain Valley, MO (US); Michael Licata, Lee's Summit, MO (US); David Gast, Lenexa, KS (US)

(73) Assignee: UNIFIED BRANDS, INC., Jackson, MS (US)

( * ) Notice: Subject to any disclaimer, the term of this patent is extended or adjusted under 35 U.S.C. 154(b) by 100 days.

(21) Appl. No.: 15/670,970

(22) Filed: Aug. 7, 2017

(65) Prior Publication Data

US 2017/0332675 A1 Nov. 23, 2017

Related U.S. Application Data

(62) Division of application No. 14/325,148, filed on Jul. 7, 2014, now Pat. No. 9,723,864.

(60) Provisional application No. 61/843,437, filed on Jul. 7, 2013.

(51) Int. Cl.
*A23L 3/365* (2006.01)

(52) U.S. Cl.
CPC .................................. *A23L 3/365* (2013.01)

(58) Field of Classification Search
CPC . A23L 3/36; A23L 3/365; F25D 17/02; F25D 21/12
USPC ........ 62/82, 125, 127, 129, 62, 64, 373, 376
See application file for complete search history.

(56) References Cited

U.S. PATENT DOCUMENTS

| | | | |
|---|---|---|---|
| 4,062,277 A | 12/1977 | Powers | |
| 5,146,843 A | 9/1992 | Fuller et al. | |
| 5,243,833 A | 9/1993 | Coelho et al. | |
| 5,665,412 A | 9/1997 | Fuller et al. | |
| 5,727,453 A | 3/1998 | Tippman | |
| 6,065,294 A * | 5/2000 | Hammerstedt | ........... F25D 3/10 422/65 |
| 6,691,608 B1 | 2/2004 | Thompson | |
| 2008/0271730 A1* | 11/2008 | Takenaka | .................. A23L 3/30 126/344 |
| 2008/0305222 A1 | 12/2008 | Takenaka | |
| 2009/0007586 A1 | 1/2009 | Takenaka | |
| 2012/0251695 A1 | 10/2012 | Neff et al. | |
| 2015/0135974 A1 | 5/2015 | Ambrosi et al. | |

FOREIGN PATENT DOCUMENTS

EP 2474242 7/2012

OTHER PUBLICATIONS

International Search Report and Written Opinion of the International Searching Authority (PCT/US2014/045617), dated Oct. 29, 2014.

* cited by examiner

*Primary Examiner* — Joseph F Trpisovsky
(74) *Attorney, Agent, or Firm* — Kutak Rock LLP

(57) ABSTRACT

An apparatus and a method of defrosting frozen items, is provided. The apparatus and method utilizes a fluid flow system and method, such as a fluid-push/pull system in which generally an entire volume of fluid is pushed or pulled through a cavity in which frozen items are located and/or a continuous motion system in which fluid is circulated within a fluid tank of the system.

20 Claims, 15 Drawing Sheets

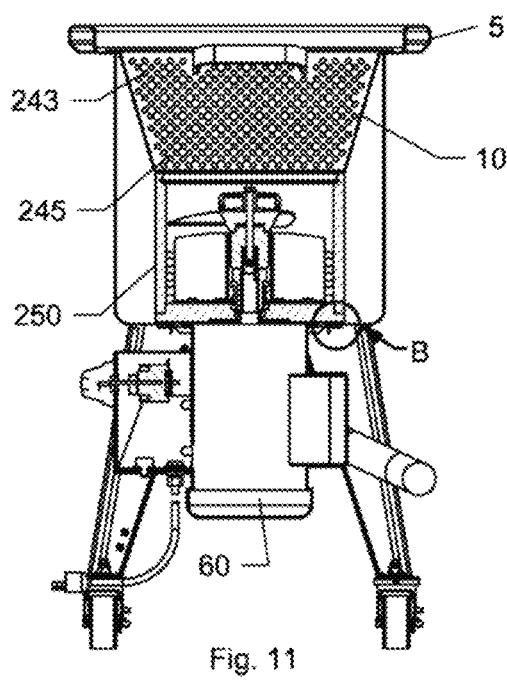
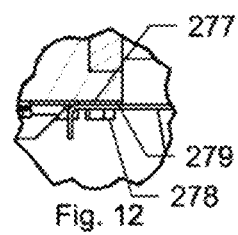

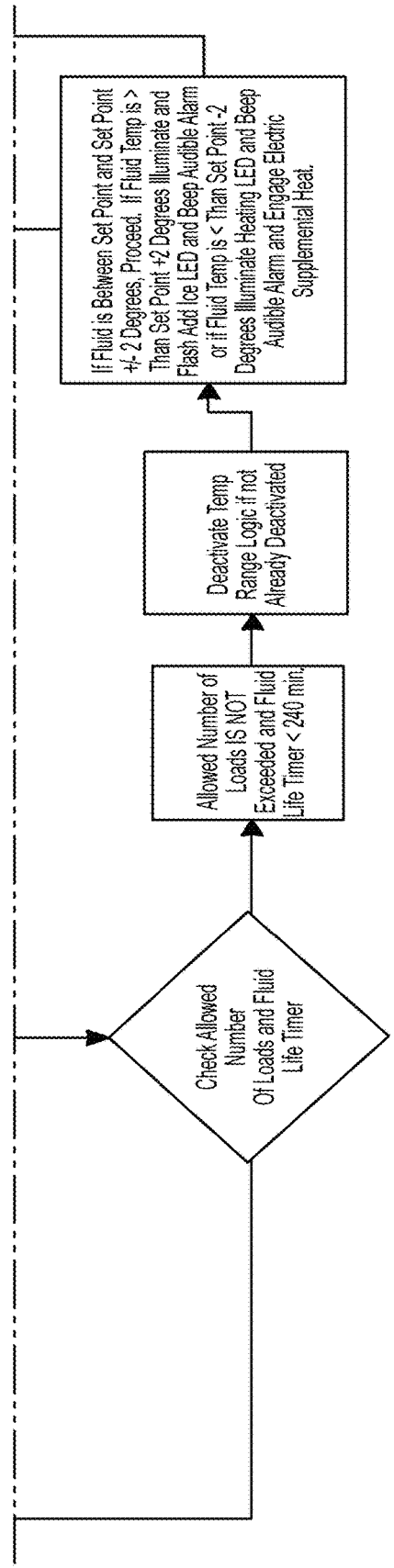

Fig. 17C

Function List:
CF:1 = Fluid Life Timer Range 30 to 300 Minuites in 30 Minute Increments
CF:2 = Fluid Set Temp Range 40F to 70F in 1 Degree Increments
CF:3 = Fluid Temp Range Low Limit 40F to 70F in 1 Degree Increments
CF:4 = Fluid Temp Range High Limit 40F to 70F in 1 Degree Increments Attached items:
Motor, 1120 RPM, 3/4 Horse, 208 Volt, 1 PH, XX Amps
SME-8
Two Liquid level sensors
Thermistor
X Kw Electric Heat Element Power Connection:
208/230 60Hz Notes:
LED Colors:
Power (Dedicated from transformer) White
Ready Green
System Heating Orange (coupled to Low Temp. Fluid indicator LED)
Unload Green
Add Ice Blue (coupled to High Temp. Fluid indicator LED)
Change Water Red
Error Purple
Low Temp. Fluid indicator Blue
Okay Temp. Fluid indicator Green
High Temp. Fluid indicator Red (coupled to add ice LED)

DEFROST APPARATUS AND METHOD THEREOF

CROSS-REFERENCE TO RELATED APPLICATIONS

This application is a divisional application of U.S. patent application Ser. No. 14/325,148, filed Jul. 7, 2014, now U.S. Pat. No. 9,723,864, which claims priority pursuant to 35 U.S.C. 119(e) to U.S. Provisional Patent Application Ser. No. 61/843,437, filed Jul. 7, 2013, the entire disclosures of which are incorporated herein by reference.

FIELD OF THE INVENTION

The present general inventive concept relates to a defrosting system and method, and more particularly, to an apparatus and a method of utilizing a fluid-push/pull system and/or continuous motion fluid system as part of a defrost system and method.

BACKGROUND OF THE INVENTION

Pot and pan washing machines, of the type used in restaurants, institutions and other eating facilities often involve a large wash tank or basin in which water (mixed with detergent, generally a cleaning "fluid") is circulated within a wash tank to wash the "wares" (i.e. pots, pans, utensils, flatware/silverware, etc.) to provide a washing action. One such machine is described in U.S. Pat. No. 4,773,436 issued to Cantrell et al. (the "'436 Patent"), the entire disclosure of which is incorporated herein by reference. The machine of the '436 Patent includes a wash tank with multiple jets evenly spaced apart at an elevated position along the rear wall of the wash tank. The tank is filled with water/detergent (fluid) to a level above the position of the jets. Pots and pans and other wares are placed in the wash tank, and a pump is activated to draw fluid from within the wash tank and direct it through the jets to create a jet stream. Each jet directs its jet stream toward the bottom wall of the wash tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provides a rolling washing action within the wash tank that results in effective cleaning of all surfaces of the wares being washed.

Additional improvements to the washing machine and method of washing wares are further disclosed in U.S. Pat. No. 6,976,496 (the "'496 Patent"), U.S. application Ser. No. 12/697,534 (the "'534" Application), and U.S. Ser. No. 12/842,984 (the "'984" Application), the entire disclosures of which are incorporated herein by reference. For instance, the '496 Patent discloses a powered utensil basket that captures a jet stream from the washing machine in which the basket is located to maintain the washing action of the machine within the basket; the '534 Application discloses a washing system and method for washing small, irregularly shaped objects; and the '984 Application discloses a washing system and method for washing produce.

Although the prior art washing machine disclosed in the '436 Patent provides an exceptional wash action for washing items, it is not designed for defrosting items. Nevertheless, it is desirable to defrost many food and other frozen items in fluid to increase defrost efficiency and safety. Furthermore, although the additional features disclosed in the '496 Patent, the '534 Application, and the '984 Application improve upon the system and method for washing items, they alone are not sufficient to enable utilization of the washing machine for defrosting items. Thus it would be beneficial to provide systems and methods of safely and rapidly defrosting food items in commercial restaurants.

SUMMARY OF THE INVENTION

An object of the present general inventive concept is to provide systems and methods of safely and rapidly defrosting food items in commercial restaurants.

An other object of the present general inventive concept is to provide a defrosting system that supports frozen food packages in an orientation that is conducive to defrosting.

An other object of the present general inventive concept is to provide a defrosting system that has one or more racks to support frozen food packages.

Another object of the present general inventive concept is to provide a defrosting system that exposes generally all surfaces of frozen items to convective heat transfer from fluid streams to effectively defrost such items.

Another object of the present general inventive concept is to provide a defrosting system that utilizes a fluid-push/pull (draft or induction system) to forcibly push/pull, channel or funnel fluid around all surfaces of submerged frozen items.

Still another object of the present general inventive concept is to provide a fluid-push/pull, draft or induction system to forcibly push/pull, channel or funnel fluid around all surfaces of submerged frozen items in such a way that the fluid has no alternative path but to travel through generally an entire mass of submerged items.

Another object of the present general inventive concept is to provide a system that is a stand-alone unit.

Another object of the present general inventive concept is to provide a system that is compact.

Another object of the present general inventive concept is to provide a standalone system that occupies a generally small footprint.

Another object of the present general inventive concept is to provide a system that drops into a counter-top and/or that is built into a counter-top.

Another object of the present general inventive concept is to provide a system that is energy efficient.

Another object of the present general inventive concept is to provide an efficient method of defrosting frozen items that conserves fluid, uses water/fluid more effectively, and consumes minimal operator time.

The above objects of the instant inventive concept are accomplished through the use of a system that includes a manifolding to direct a flow of fluid (such as water) through a cavity (or cavities) containing frozen items, such as frozen food packages. A pumping system (including a propeller, impellor or other suitable pumping method, as well as appropriate manifolding) moves the fluid through the pumping system (including appropriate manifolding) to create a substantial flow of fluid through generally the entire cavity (cavities). Fluid is forced through the cavity (cavities) and thus around the frozen food packages positioned within the cavity (cavities). In some preferred embodiments, the fluid essentially is provided no alternative path of travel to circulate through the defrosting system other than directly through generally the entire mass of frozen food items located within the cavity (cavities). As a result, the flow of fluid more fully and closely surrounds and travels around the entire surface of each frozen item (or one or more other objects/parts) within the cavity (cavities) which substantially improves upon stagnant fluid thawing systems.

In some embodiments, the pumping system generally pushes fluid through said cavity (cavities). In such embodiments, one or more openings of the cavity (cavities) are located at the discharge location of the pumping system, and the fluid flow from the discharge of the pumping system is forced through the cavity (cavities) and thus through (or around) the object(s) contained therein. The fluid is returned to the pumping system after it has been forced around the surfaces of the object(s) in the cavity (cavities) via one or more openings at the intake location of the pumping system. In some such embodiments, the cavity (cavities) is generally open at the intake location of the pumping system to provide little to no back pressure, except for gravity which ultimately assists in directing the flow of fluid from the cavity back into the pumping system. In other such embodiments, a closed fluid circuit is utilized.

In some embodiments, the pumping system generally pulls fluid through said cavity (cavities). In such embodiments, one or more openings of the cavity (cavities) are located at the intake location of the pumping system, and the fluid flow from the intake of the pumping system pulls fluid out of the cavity (cavities) and thus through (or around) the object(s) contained therein. The fluid is returned to the pumping system after it has been forced around the surfaces of the object(s) in the cavity (cavities) via one or more openings at the discharge location of the pumping system. In some embodiments, the cavity (cavities) is generally open at the discharge location of the pumping system to provide little to no back pressure, except for gravity which ultimately assists in directing the flow of fluid from the pumping system back into the cavity (cavities). In alternative embodiments, a closed fluid circuit is utilized.

In some embodiments of both the fluid push and fluid pull embodiments discussed above, the flow of fluid from the pumping system discharge is allowed to change velocity and/or direction through the use of gravity prior to its return through the pumping system. In other words, the pumping system intake (draw) is not the only influence in the direction and/or velocity in which the fluid flows from the pumping system discharge through the cavity (cavities) and/or the manifolding. In alternative embodiments, the design of the structure of the cavity (cavities) and/or the manifolding significantly alters at least a portion of the flow direction and/or velocity of fluid through the cavity (cavities).

In one embodiment, the pumping system is capable of operation in both forward and reverse directions, such that the pumping system may alternatively be operated in a first direction to push fluid into the opening(s) of the cavity (cavities), in a second direction to pull fluid down through the opening(s) of the cavity (cavities). In one such embodiment, a control system of the pumping system automatically oscillates the pumping system between forward and reverse directions during a defrost cycle (i.e. 10 minutes forward and then 10 minutes reverse or 10 minutes forward, 10 minutes off, 10 minutes reverse, etc.). In still another embodiment, a control system of the pumping system pulses operation of the pumping system to pulsate the flow of fluid through the cavity (cavities) of the defrosting system of the inventive concept. For example, the pumping system may be pulsed to operate in the forward direction for 1 minute and then turned off for one minute (or forward 1 minute, off 1 minute, reverse 1 minute, etc.).

In some embodiments, the manifolding is created at least in part by the housing of the defrosting system.

In yet other embodiments, a wall (or walls) of the cavity (cavities) forms at least a part of the manifolding. In some such embodiments, the cavity (cavities) wall (or walls) includes openings (perforations, holes, slots, vents, etc.) to allow fluid to flow between the cavity (cavities) and the pumping system. In some embodiments, one or more wall openings are located toward the top of the cavity (cavities) to result in a generally vertical fluid path through the cavity (cavities) during operation of the inventive system. In other embodiments, the wall opening(s) are also located toward the lower half of the cavity (cavities) to result in an at least a partially horizontal fluid path through the cavity (cavities) during operation of the inventive system (i.e. the draw of the pumping system will alter a portion of the fluid path from vertical to horizontal, or from horizontal to vertical, depending upon the direction of operation of the pumping system). This aids in eliminating "dead zones" (areas of stagnant defrosting fluid) within the cavity. In a preferred embodiment, the density of the wall opening(s) located toward the lower half of the cavity (cavities) is lower than the density of the wall opening(s) located toward the upper half of the cavity (cavities), such that the fluid path through the cavity (cavities) is substantially vertical. It will be appreciated that the density and/or pattern of wall opening(s) in the wall(s) of the cavity (cavities) may be varied considerably depending upon the desired and/or optimal fluid flow path through the cavity (cavities) and without departing from the spirit and scope of the instant invention.

In other embodiments, the intake/discharge opening(s) in the cavity (cavities), the structure of the cavity (cavities), and/or the structure of the pumping system, are configured to provide a generally even flow of fluid across substantially an entire cross section of the cavity (cavities), where fluid is present, and preferably through generally the entire volume, of the cavity (cavities). In one such embodiment, the cavity (cavities) includes tubes, vanes or baffles extending toward, into or through the opening(s) from the cavity (cavities) toward the pumping system intake (when the pumping system is pulling fluid through the cavity) or discharge (when the pumping system is pushing fluid through the cavity) to help direct the flow of fluid from and/or into the cavity (cavities). In one embodiment, the tubes, vanes or baffles are part of an intake/discharge plate that is located at the pumping system intake location of the cavity (cavities) when the pumping system is pulling fluid through the cavity (cavities), or at the pumping system discharge location when the pumping system is pushing fluid through the cavity (cavities), between the intake/discharge (when pulling/pushing respectively) opening(s) and the pumping system. In another embodiment, the intake/discharge opening(s) of the cavity (cavities) and the diameter of the intake/discharge of the pumping system generally spans across the entire end of the cavity (cavities) to create the generally even flow of fluid through the cavity.

In some embodiments, the systems, or variations thereof, described above are utilized as a defrosting system for frozen food items to safely and rapidly defrost food items in commercial restaurants/kitchens. In some such embodiments, the cavity (cavities) includes one or more racks for holding frozen food item packages therein. The racks hold the items in a manner that allows the fluid within the system to circulate around the frozen packages as it is pulled or pushed through the cavity (cavities). In some embodiments, the system includes a cooling unit in association with the pumping system to maintain fluid temperature within a predetermined temperature range for safe rapid defrosting. In another such embodiment the cooling unit is a solid state device that can make heat or cool and that is attached to the body of the system to maintain the desired temperature throughout the defrosting process. In some embodiments one or more temperature sensors or thermistors are utilized in combination with a controller for the system to measure temperature changes and/or heating/cooling and utilize thermodynamic principles to determine when an item has been defrosted and provide a visual or audible signal to a system user that the item is defrosted. In some such embodiments, the system assumes a base temperature of frozen items and measures temperature changes to the fluid after the items are added and/or during the defrosting process. In some embodiments, the system includes one or more fluid level sensors, or other suitable sensors, that measure the amount of displacement of fluid within the cavity (cavities) as items are added to the cavities to aid in the control system determining or estimating defrost time.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept and various features thereof.

BRIEF DESCRIPTION OF THE DRAWINGS

A preferred embodiment of the present general inventive concept, illustrative of the best mode in which the applicant has contemplated applying the principles, is set forth in the following description and is shown in the drawings.

FIG. 11 is a front elevation sectional view of the defrosting system of FIG. 10 taken along line A-A.

FIG. 12 is a detailed view of area B shown in FIG. 11.

DETAILED DESCRIPTION OF THE PREFERRED EMBODIMENTS

Figure 1:
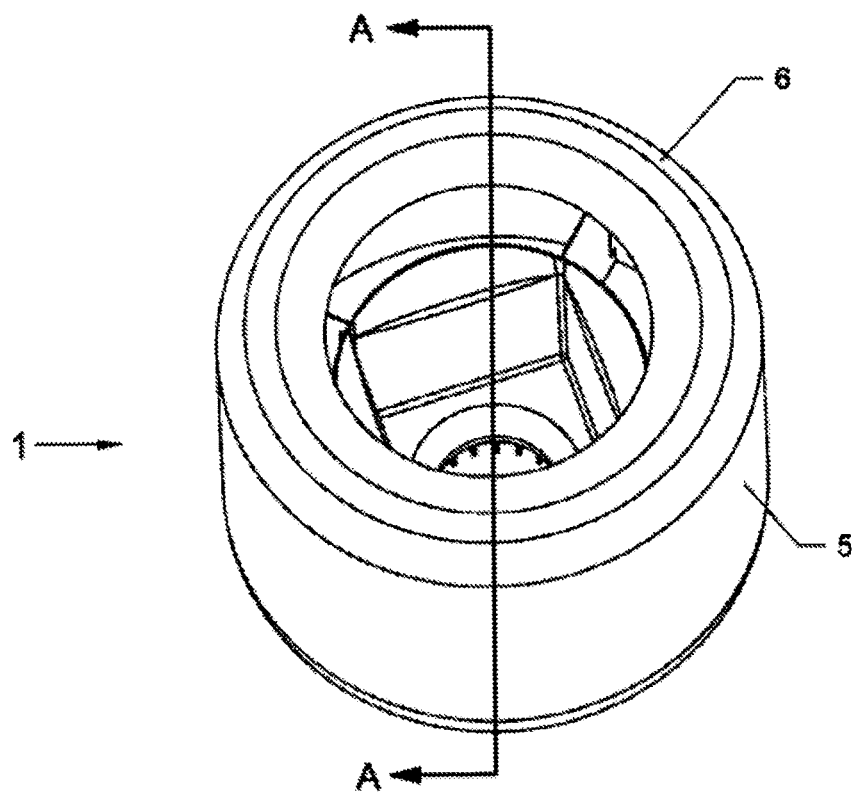
FIG. 1 is a top perspective view of a defrosting system of an embodiment of the present general inventive concept.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A method of defrosting items 30 in a defrosting machine 1 is provided. An embodiment of the method includes the following steps. A cavity 10 of the defrosting machine 1 is filled with a defrosting fluid. A fluid level sensor identifies when the fluid level in the cavity 10 has reached a prescribed threshold fluid level. After the fluid reaches the threshold fluid level, a temperature sensor measures the temperature of the defrosting fluid and compares it to a first predetermined temperature range. In one such embodiment, the first predetermined temperature range is 38 F+/−1 F. In other such embodiments, the first predetermined temperature range is based upon local food safety requirements and/or operator preferences. In some embodiments, the temperature range is pre-programed into the control system of the defrosting machine. In other embodiments, the temperature range is capable of being adjusted by an operator.

If the measured temperature is outside of the first predetermined temperature range, a control system prevents a fluid pump of the defrosting machine 1 from engaging. If the measured temperature is within the first predetermined temperature range, the control system illuminates a first indicator to indicate that a user may begin a defrost cycle, the control system enables a start button to allow a user to begin a defrost cycle, and/or in some embodiments the control system automatically begins a defrosting cycle.

In some embodiments, the defrosting machine 1 includes a means of heating and/or cooling the defrosting fluid to reach and/or maintain a temperature within a predetermined temperature range. In other embodiments, the defrosting machine 1 includes audible and/or visual indications that the fluid temperature is above or below the predetermined temperature range. In one such embodiment, at least one such audible or visual indicator indicates that a user should add ice to the defrosting fluid. In another such embodiment, at least one such audible or visual indicator indicates that a user should change the defrosting fluid.

The method of defrosting items 30 also optionally includes the step of monitoring the fluid temperature throughout the defrosting process and until the defrosted items 30 are removed from the defrosting machine 1. For instance, if the temperature of the defrosting fluid becomes too cold after transferring heat energy to the frozen items 30, the control system engages a heating device to introduce additional heat energy to the defrosting fluid. In another example, if the temperature of the defrosting fluid becomes too warm, the control system engages an audible and/or visual indicator warning a user that ice should be added to the water, that the defrosting fluid should be replaced, and/or that the items 30 should be removed.

In one embodiment, the control system is programed to perform different functions and/or provide different indications depending on how high the temperature of the defrosting fluid is relative to predetermined temperature ranges. In such an embodiment, the control system is programed with a first, second, and third temperature range. When the measured temperature range is above the first temperature range but inside the second and third temperature ranges, the control system provides a first indicator directing a user to add ice to the defrosting fluid. When the measured temperature is above the second temperature range but inside the third temperature range, the control system provides a second indicator that the water should be changed and/or that the items 30 should be removed from the defrosting machine 1 when convenient. When the measured temperature is above the third temperature range, the control system provides a third indicator that the water should be changed and/or the items 30 should be removed from the defrosting machine 1 as soon as possible. In this way, a control system can be programed to provide a user with a more noticable warning when the risk of food spoilage is greater.

In another embodiment, the control system is programed to perform different functions and/or provide different indications depending on how low the temperature of the defrosting fluid is relative to predetermined temperature ranges. In such an embodiment, the control system is programed with a first and second temperature range. When the measured temperature range is below the first temperature range but inside the second temperature range, the control system engages a heating device (not shown) to introduce additional heat energy into the defrosting fluid. When the measured temperature is below the second temperature range, the control system provides an indication that the defrosting fluid should be replaced and/or the control system initiates a process of draining the existing defrosting fluid and refilling the cavity with new defrosting fluid. In this way, in some embodiments the control system is programed to minimize the risk of overworking a heating device when the heat energy required to increase the temperature of the defrosting fluid is beyond the capabilities of the heating device.

In one embodiment of the present invention, the defrosting machine 1 is a continuous motion style defrosting machine 1. Referring to FIGS. 1-5, one embodiment of a continuous motion style defrosting machine 1 includes a generally cylindrical housing 5 with inwardly curved upper and lower portions 6 and 7 that act as a manifolding to respectively direct a flow of fluid to and from an impeller 9 and through a cavity 10 for holding frozen items 30. Although impeller 9 shown in the embodiment of FIGS. 1-5 is a centrifugal-type impeller, it will be appreciated that a centrifugal-type pumping system, a propeller-type pumping system, or any other type of pumping system now known or hereafter developed that is suitable for moving a large volume of fluid may be utilized in any of the embodiments disclosed herein without departing from the spirit and scope of the instant invention.

The housing 5 is filled with defrosting fluid (water or other suitable fluid), preferably to a level near or above the top of the cavity 10. Upon activation of motor 60 which drives the impeller 9, a vacuum is created that pulls fluid into impeller 9. A stream of fluid is then ejected, pushed, or otherwise diverted from the impeller 9 in a lateral direction and to the lower portion 7. The wall of lower portion 7 changes/redirects the direction of the fluid ninety degrees (90° toward an upward direction as the fluid flows along an interior, generally straight wall 8 of the housing 5. The straight wall 8 connects to the upper portion 6 of the housing 5. As the fluid reaches the upper portion 6, the direction of the stream of fluid is redirected by the upper portion 6 of the housing and/or by gravity toward the center of the housing 5 and downward through cavity 10. In the embodiment shown in FIGS. 1-5, the path of the stream of fluid is redirected by upper portion 6 of housing 5 at an angle of approximately 120°. Nevertheless, it will be appreciated that the angles at which the stream of fluid may be redirected at any particular point within housing 5 (e.g. by lower portion 7, by upper portion 6, or by additional manifolding structures anywhere therebetween or otherwise within housing 5 and/or by gravity) will vary considerably without departing from the spirit and scope of the instant invention and that alternative manifold structures will be apparent to those of ordinary skill in the art.

Figure 2:
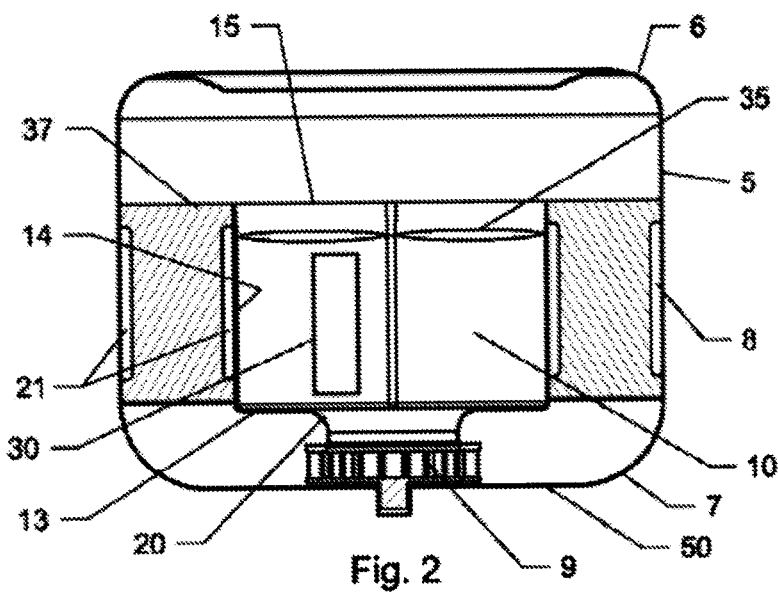
FIG. 2 is a front elevation sectional view of the defrosting system of FIG. 1 taken along line A-A.
Figure 3:
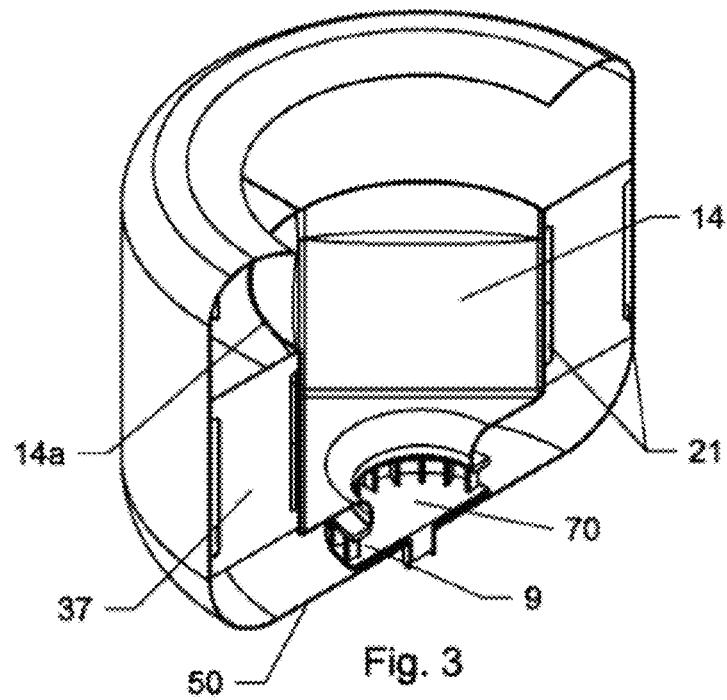
FIG. 3 is a side perspective sectional view of the defrosting system of FIG. 1 taken along line A-A.
Figure 4:
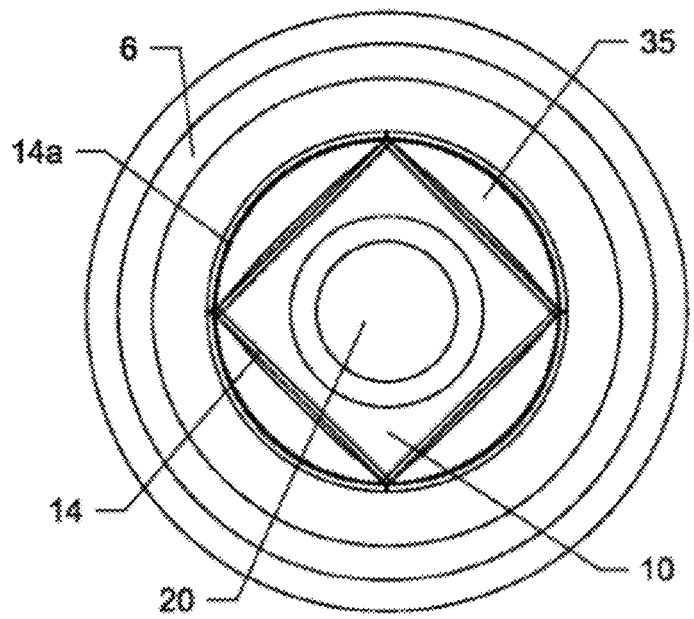
FIG. 4 is a top plan view of the defrosting system of FIG. 1.

The downwardly-directed fluid enters the cavity 10, which in a preferred embodiment includes one or more support racks 12 (shown in FIG. 5) for supporting frozen items 30. As shown in FIG. 2, the cavity 10 includes a bottom surface 13, side surfaces 14, and an open top 15. The open top results in little to no back pressure, except for gravity which assists in directing the flow of fluid into cavity 10. Bottom surface 13 includes opening 20 to provide an intake port between cavity 10 and interior 70 of impeller 9. In an embodiment, a perforated screen is located over opening 20 to prevent items 30 from being pulled into impeller 9 during operation. It will be appreciated that alternative structures for opening 20 and bottom surface 13 will be utilized in other embodiments without departing from the spirit and scope of the instant invention. For example, in one alternative embodiment, opening 20 comprises multiple small apertures/perforations through surface 13, such that surface 13 itself acts as a screen to prevent items 30 from being pulled into impeller 9 while at the same time allowing fluid to be drawn into impeller 9 through the apertures. It will further be appreciated that the dimensions and shape of opening 20, as well as the size of impeller 9, will vary significantly in alternative embodiments depending upon the desired flow characteristics. In the embodiment shown in FIGS. 1-5, the diameter of the intake (opening 20) of cavity 10 is considerably smaller than the diameter of cavity 10 itself. Thus, it will be appreciated that various embodiments will include tubes, vanes or baffles extending toward, into or through opening 20 of cavity 10 and toward impeller 9 to help direct the flow of fluid from cavity 10 to impeller 9. In one embodiment, the tubes, vanes or baffles are part of a plate that is located at opening 20 (either partially or totally within cavity 10 or partially or totally within the manifolding, or partially within cavity 10 and partially within the manifolding). In another embodiment, the opening 20 generally extends across the entire area of bottom surface 13, such that a generally even flow is created through the entire volume of cavity 10. In still another embodiment, the shape or other design elements of the manifolding help to direct the flow of fluid from cavity 10 to impeller 9. It will be appreciated, that although the flow control structures described above are discussed in connection with a system in which fluid is pulled from cavity 10 to impeller 9, the same or similar control structures will also be utilized in connection with some embodiments of systems in which fluid is pushed into the cavity from a propeller or other pumping method. Furthermore, it will be appreciated that the flow control structures, and other various components of the defrosting apparatuses discussed in any embodiment herein may be interchangeable with similar components in other embodiments discussed herein and/or in other non-discussed embodiments that will be apparent to those of ordinary skill in the art.

Figure 5:
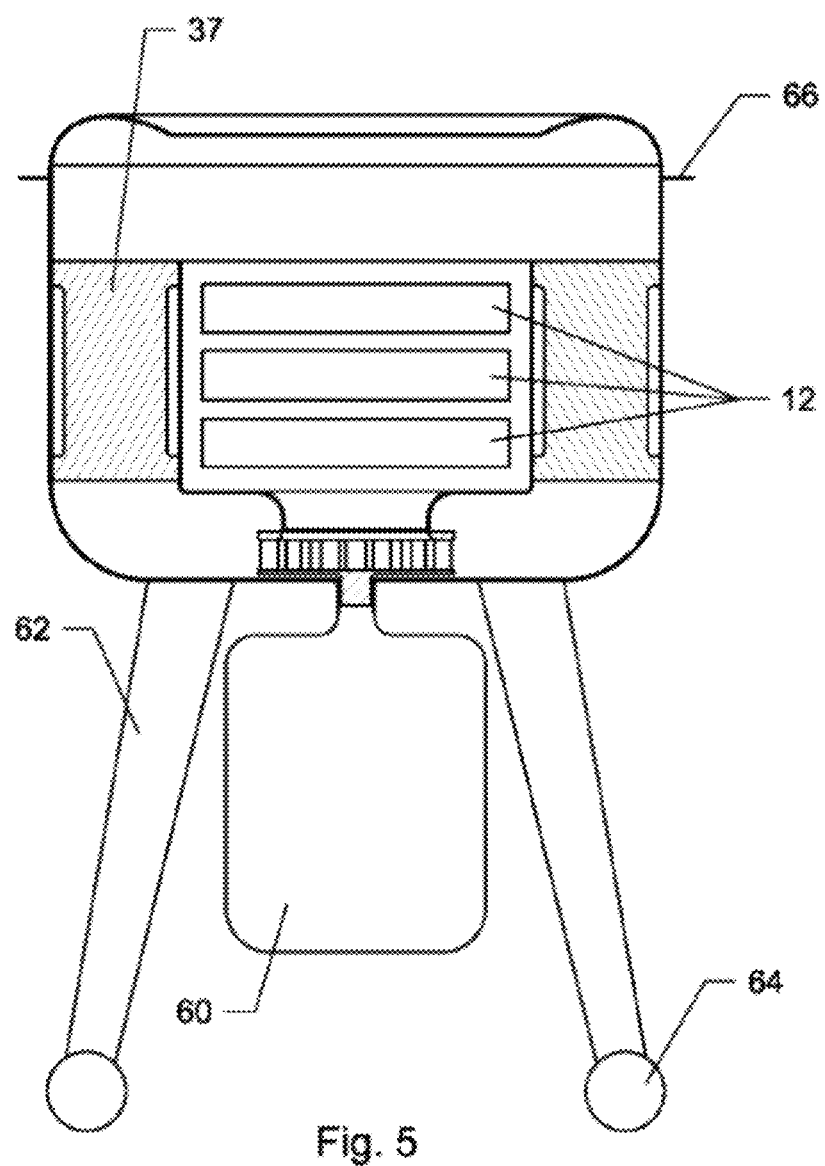
FIG. 5 is a front elevation sectional view of a defrosting system of another embodiment of the present general inventive concept similar to that of FIG. 1.

In the embodiment shown in FIGS. 1-5, the side surfaces 14 are arranged together such that cavity 10 is generally cube shaped (square in a horizontal cross-section as shown in FIG. 5). Such a shape allows for the use of conventional support racks 12 within cavity 10. Nevertheless, it will be appreciated that the shape of cavity 10 used in connection with any of the embodiments discussed herein may be altered without departing from the spirit and scope of the instant invention. For example purposes only, the cross-sectional shape of cavity 10 in the embodiment shown in FIGS. 1-5 in other embodiments will be rectangular, circular, triangular, or any other shape desired rather than the square shape shown. In the embodiment shown in FIGS. 1-5, the upper edges 35 of side surfaces 14 are beveled upward and outward toward a separate internal side wall 14a of housing 5. The internal side wall 14a creates a generally cylindrical manifolding cavity with wall 8. The generally cylindrical shape of the manifolding cavity allows for a generally laminar flow of fluid from impeller 9 and into cavity 10. Notwithstanding, it will be appreciated that in other embodiments alternative shapes will be utilized without departing from the spirit and scope of the instant invention. Moreover, it will be appreciated that in some embodiments internal side wall 14a will be eliminated entirely without departing from the spirit and scope of the instant invention.

Cavity 10 is supported within housing 5 by web sections 37 which span from wall 8 of housing 5 to wall 14 of the cavity 10. In the embodiment shown in FIGS. 1-5, four web sections 37 are utilized to connect wall 8 of housing 5 to each of the four corners of the generally cube-shaped cavity 10. Web sections 37 include openings 21 to allow fluid to flow freely within the entire volume of the manifolding created by cavity 10 and housing 5. It will be appreciated that in some embodiments alternative structures and arrangements of web sections 37 will be utilized without departing from the spirit and scope of the instant invention. For example purposes only, an alternative embodiment will utilize two (2) web sections rather than four, and the size and shape of openings 21 in some embodiments will be altered significantly from that shown in FIGS. 1-5.

The support rack 12 in various embodiments will be a single rack, or a plurality of racks, of which one, some, or all will or will not be removable from the cavity 10. In one embodiment all support rack(s) are removable from cavity 10. In an embodiment, the support rack 12 includes one or more internal walls bridging the side surface 14 of cavity 10, sized and shaped to maintain a desired orientation of the frozen items 30. For instance, the frozen items 30 are in various embodiments positioned standing up, laying down, angled, and/or stacked or piled on top of each other depending upon the structural design of the support rack and/or cavity 10. In the embodiment shown in FIG. 5, multiple support racks 12 are stacked or stackable on top of one another. In an alternative embodiment, multiple support racks (compartments, or cavities) are oriented along side each other (i.e. side by side instead of on top of one another).

The impeller 9 both pulls fluid from opening 20 of cavity 10 and discharges fluid into open top 15 of cavity 10, creating a generally even flow of fluid through the entire volume of the cavity 10. This generally high volume of fluid forces the fluid to flow through cavity 10 more fully such that the flow of fluid more closely surrounds the entire surface of each piece of frozen item 30 within the cavity 10. The flow of fluid through cavity 10, essentially has no alternative path but to travel through generally the entire mass of frozen items 30 within cavity 10 (e.g. around all exposed surfaces of each item). Thus, deflections are greatly reduced.

In a preferred embodiment, the housing 5 in capable of being disassembled for easy cleaning. In one embodiment, the housing is capable of being disassembled into three sections, i.e., the upper portion 6 may be removed at the internal straight wall 8, which is also capable of being removed at the lower portion 7. The upper portion 6, internal straight wall 8, and lower portion 7 are capable of being securely coupled using latches (not illustrated), screwed together with corresponding inner and outer threaded surface, or other like engagement means.

In one embodiment, fluid (i.e. water, etc.) is automatically and/or manually input into and/or output from the system. In one embodiment, water is input into cavity 10 through the generally open central portion of the top surface of housing 5. In another embodiment, a drain (not shown) is located along bottom surface 50, to allow fluid (water, etc.) to be quickly and easily removed from the system. Once the system 1 is filled with fluid (water, etc.), the system 1 is self-sustaining such that fluid need not be added for a certain amount of time, e.g., until the fluid temperature is beyond a predetermined temperature threshold. In a preferred embodiment, system 1 is filled to a level of fluid above the top of upper beveled edges 35 such that the fluid fills the cavity 10 as well as the manifolding created by the housing 5. In one embodiment, an overflow drain is included above the preferred fluid level to prevent overflow of system 1.

In one embodiment, the system 1 of the instant invention is a stand-alone unit that is capable of being located in any convenient location in kitchen or restaurant. As is shown in FIG. 5, such an embodiment includes legs 62 extending from housing 5 and wheels 64 to allow the unit to be easily moved. In another embodiment, the system 1 of the instant invention is capable of being mounted within (or dropped into) a countertop or table. In one such embodiment, housing 5 includes annular lip 66 that allows system 1 to be dropped into a cutout in the countertop/table in the same or similar manner in which a sink/basin would be installed.

Figure 6:
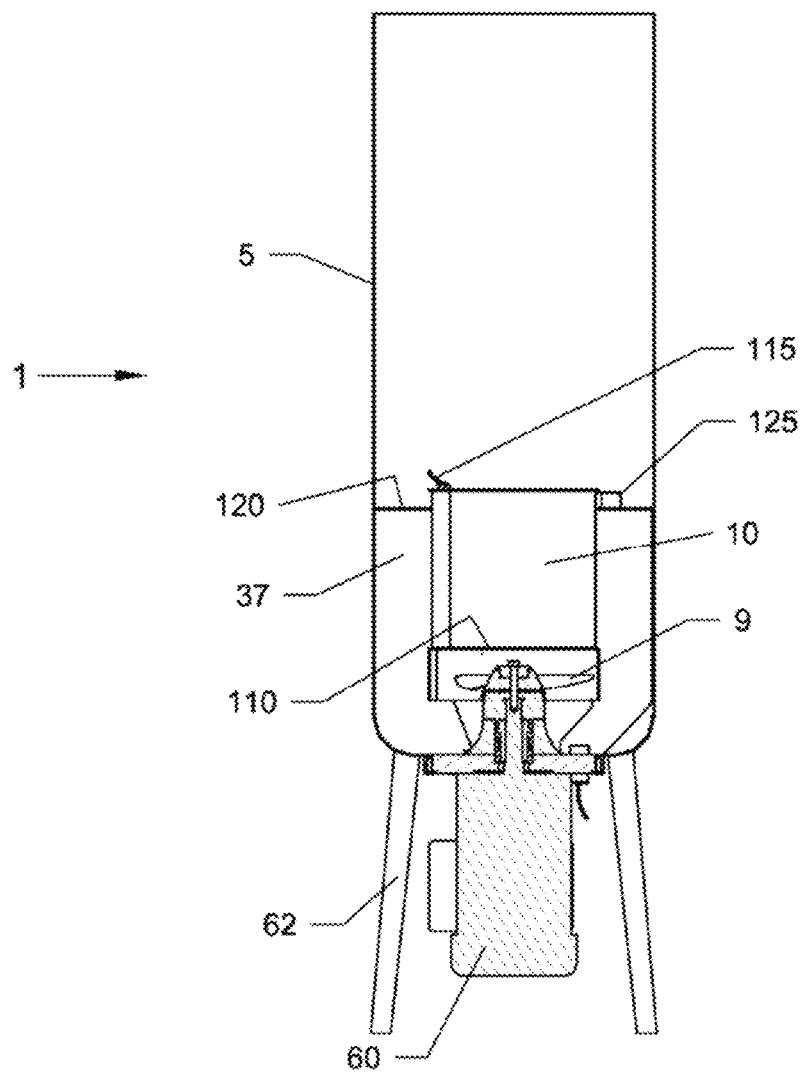
FIG. 6 is a front elevation sectional view of a defrosting system of still another embodiment of the present general inventive concept.
Figure 7:
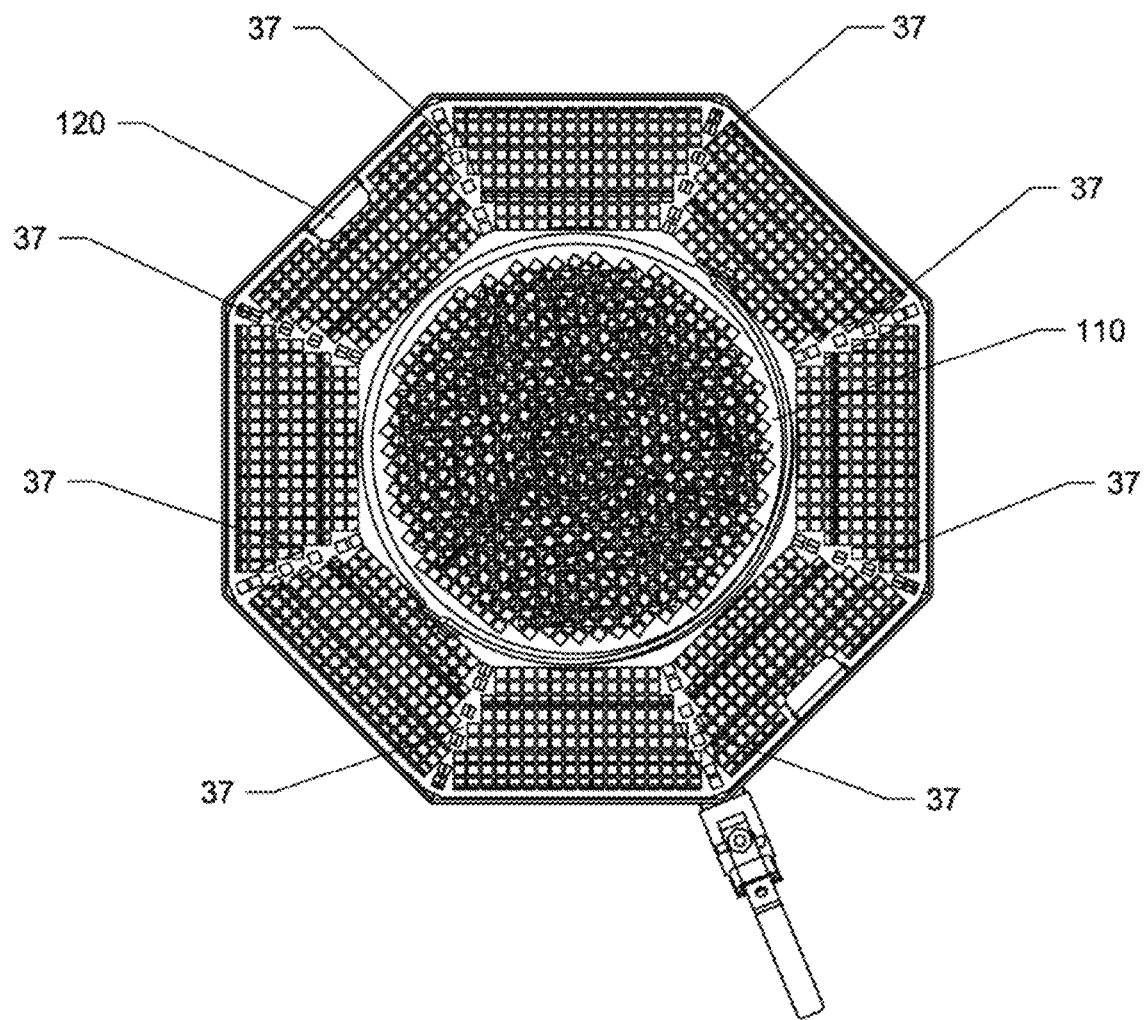
FIG. 7 is a top plan view of the defrosting system of FIG. 6.
Figure 8:
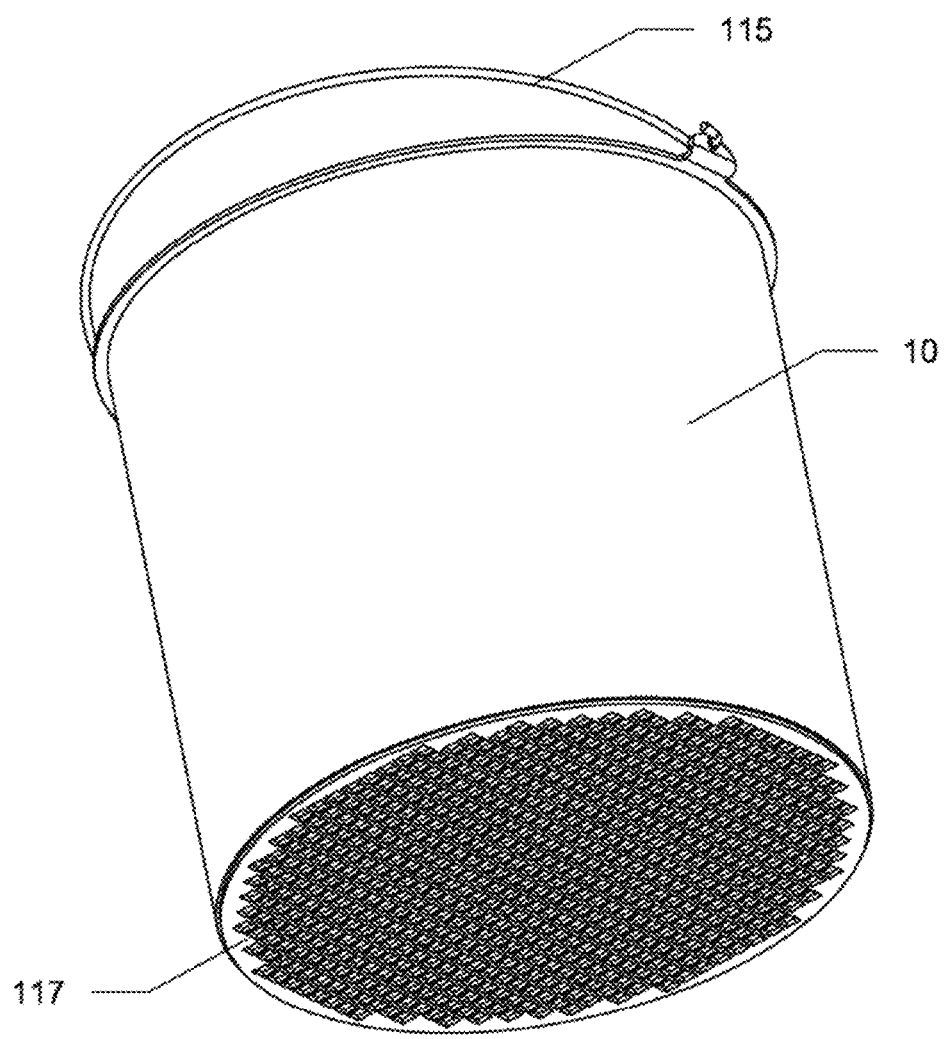
FIG. 8 is a bottom perspective view of a removable cavity of the defrosting system of FIG. 6.
Figure 9:
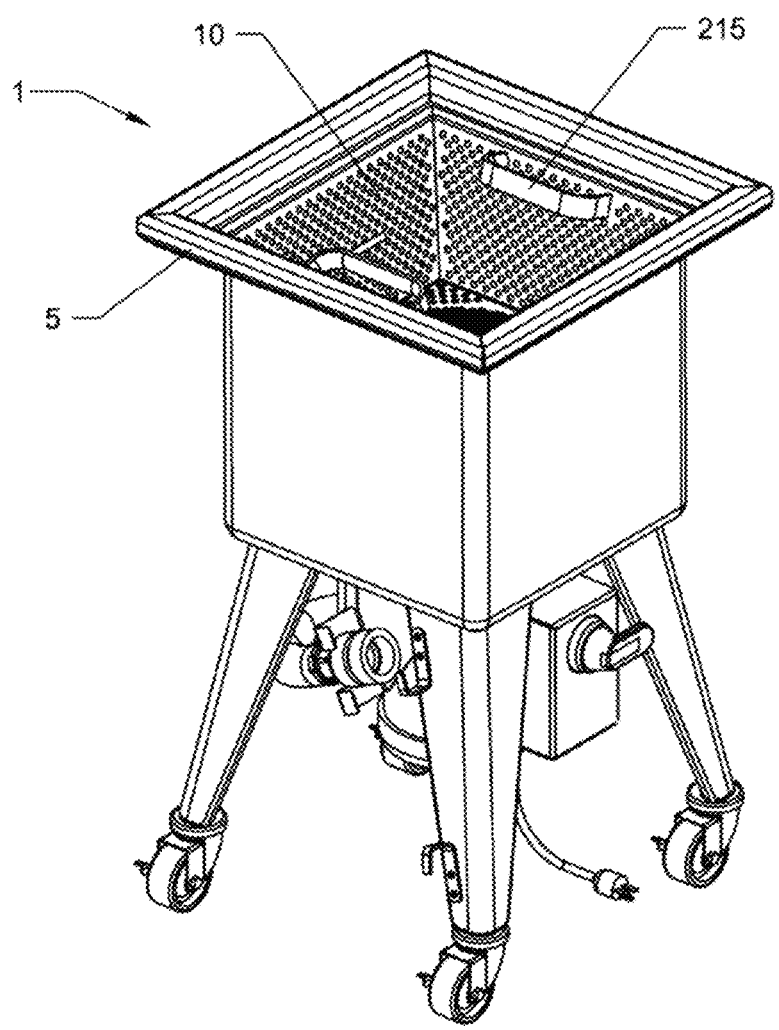
FIG. 9 is a top perspective view of a defrosting system of yet another embodiment of the present general inventive concept.

Referring to FIGS. 6 through 8 another embodiment of a defrosting machine 1 is shown and described in which cavity 10 is removably located within housing 5. Cavity 10 is a bucket-type container that includes handle 115 for removing cavity 10 from housing 5, and includes generally perforated bottom 117 to allow fluid to flow into and/or out of the bottom of cavity 10 while at the same time maintaining frozen items 30 within cavity 10. Web sections 37 extend from the inner surfaces of housing 5 toward its center. Web sections 37 are connected to perforated intake member 110 which covers propeller 9, and to perforated upper support member 120. Intake member 110 acts as a shelf on which cavity 10 is positioned during operation of system 1. Upper support member 120 provides support for web sections 37 and also acts as a guide for positioning cavity 10 properly within housing 5. The perforated surface of upper support member 120 allows fluid to flow through as system 1 operates. Upper support member 120 includes grip member 125 for easy removal of support member 120 for cleaning.

Housing 5 shown in FIGS. 6 through 8 is generally octagonal in shape for ease of manufacturing. Nevertheless, it will be appreciated that in various embodiments any shape of housing will be utilized in connection with the embodiment of FIGS. 6 through 8 (or in any other embodiment) without departing from the spirit and scope of the instant invention. Furthermore, it will be appreciated that alternative housing and component structures, such as double-skinned or insulated walls, will be utilized in other embodiments without departing from the spirit and scope of the instant invention.

Figure 15:
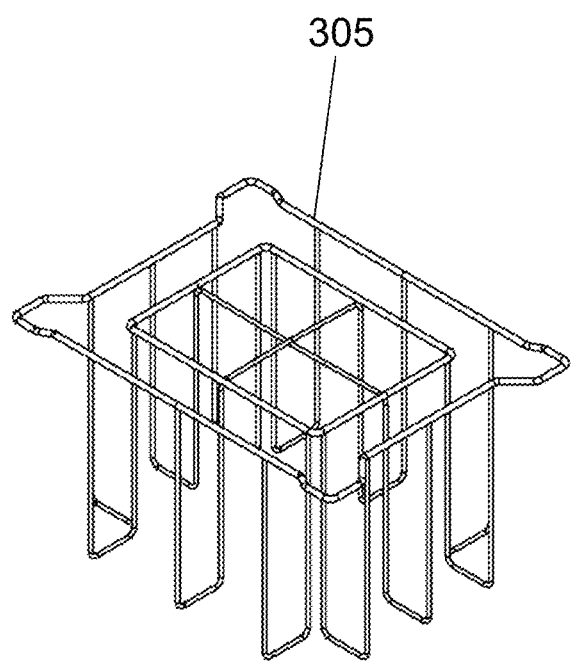
FIG. 15 is a top perspective view of a removable basket of the defrosting system of FIG. 14.
Figure 16:
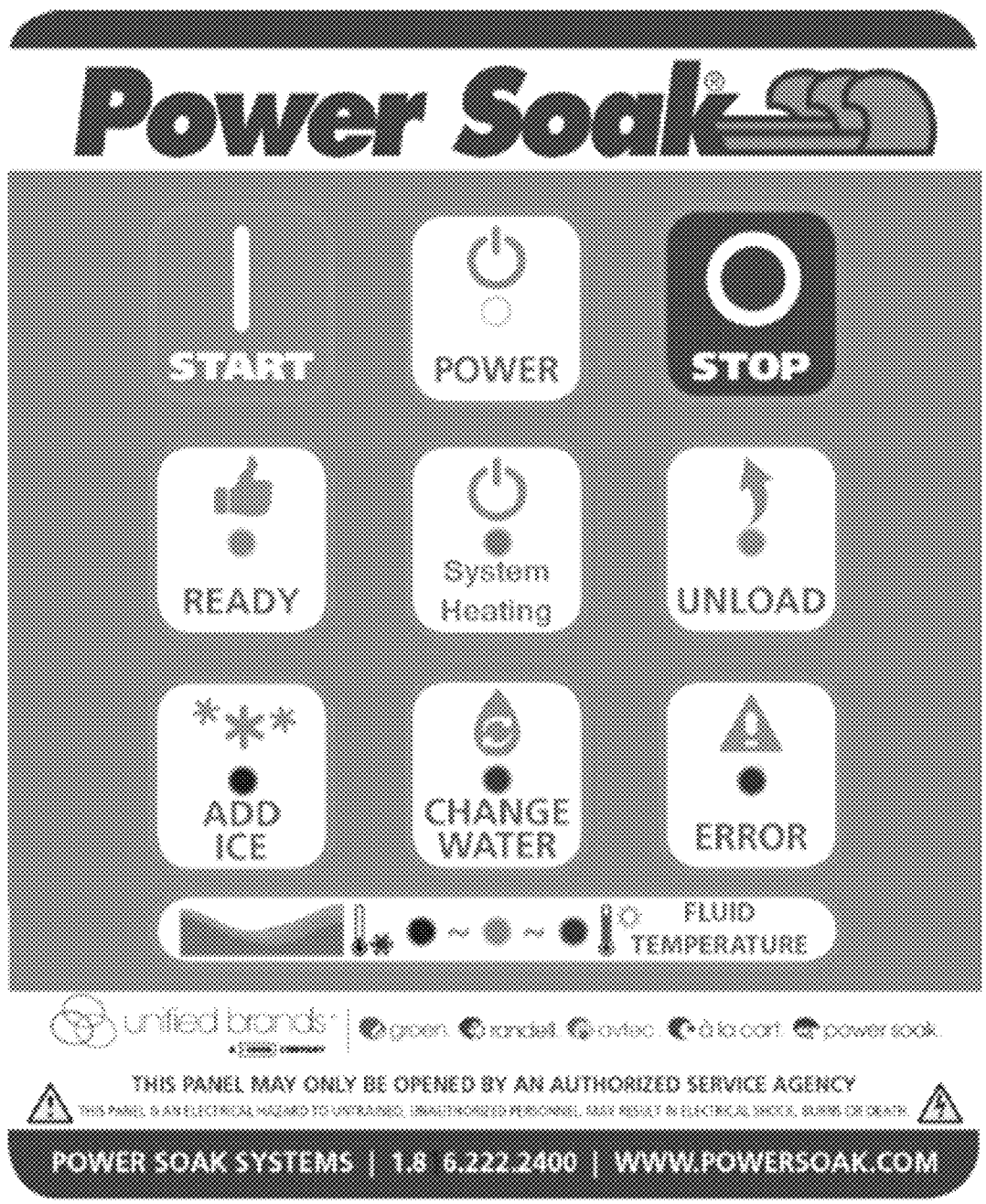
FIG. 16 is a front elevation view of a control panel/display screen for a defrosting system of the inventive concept showing various control buttons and indicators.
Figure 17A:
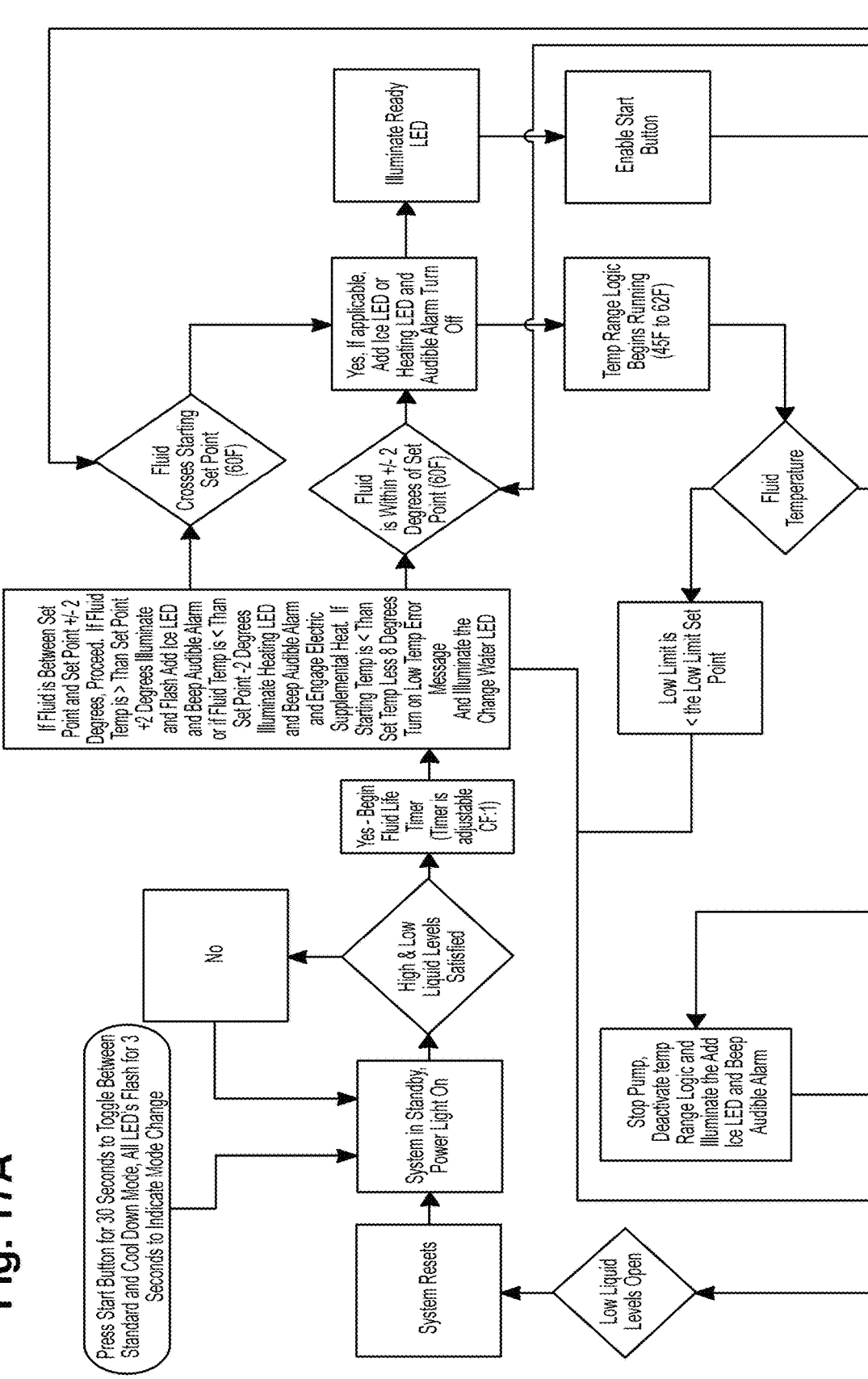
FIG. 17 (FIGS. 17A through 17C) is a logic flow chart illustrating an embodiment of the method of operation of a system of the inventive concept.
Figure 17B:
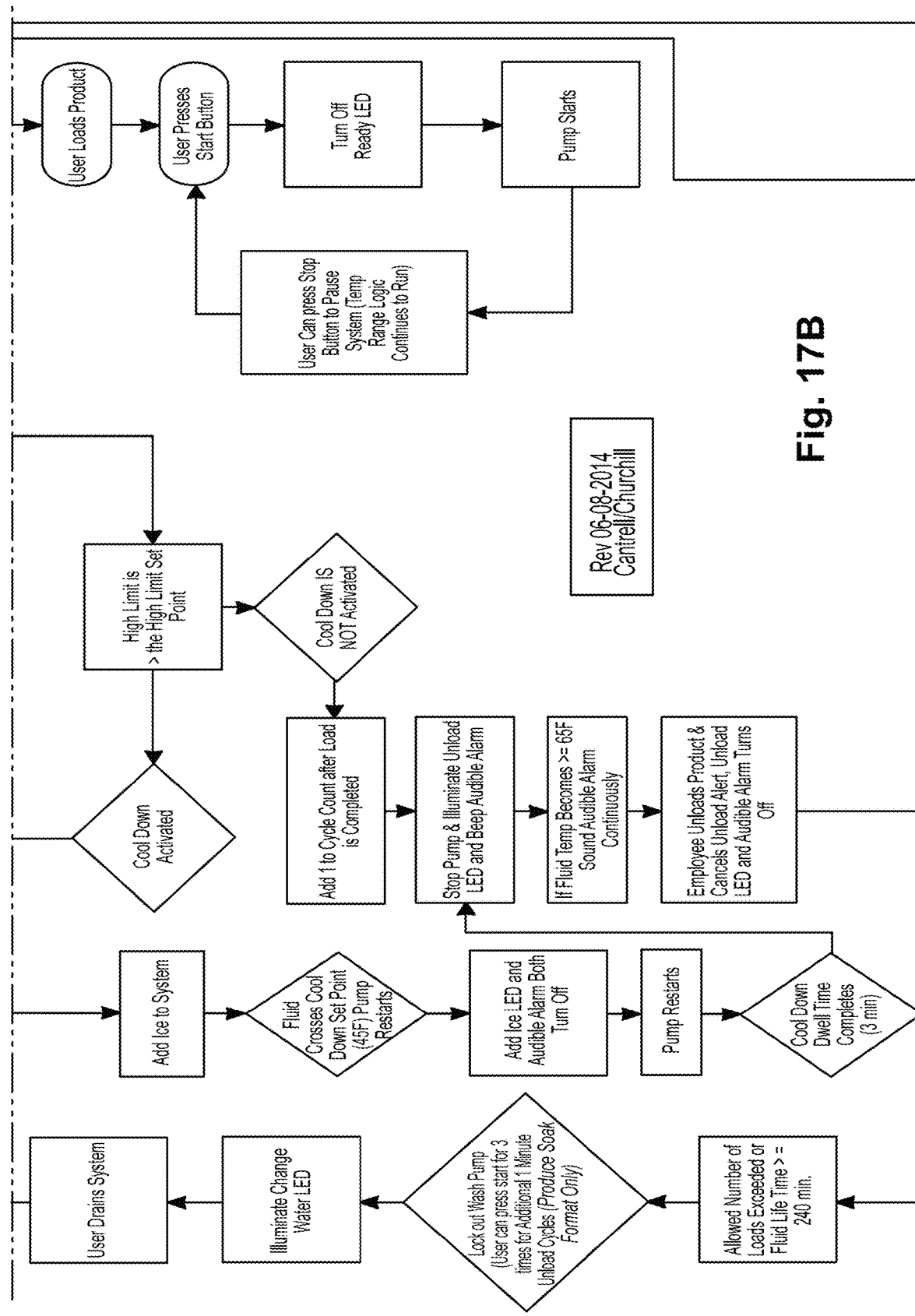

In operation, cavity 10 is filled with frozen items 30 and is positioned within housing 5 onto intake member 110. In the embodiment shown, numerous pieces of frozen items 30 are randomly pilled on top of one another into a mass within cavity 10 and/or oriented separate from one another (such as through use of a rack of the type discussed below with respect to FIG. 15. Nevertheless, it will be appreciated, that support racks similar to those discussed above with respect to the embodiment shown in FIGS. 1-5 will also be utilized in some embodiments. Cavity 10 and/or housing 5 is filled with fluid (note that housing 5 is capable of being filed while cavity 10 is removed, or while cavity 10 is located within housing 5) to a level preferably above the frozen items 30 (i.e. the frozen items 30 are completely submerged) and that is preferably above upper support member 120. Motor 60 is activated to drive propeller 9 to cause the flow of fluid through cavity 10. Preferably, the direction of motor 60 is capable of being reversed to alternately drive propeller 9 in either a forward or reverse direction. In one of the forward or reverse directions, propeller 9 will create a suction that pulls fluid downward through intake member 110. In the other of the forward or reverse directions, propeller 9 will push water upward through intake member 110 (making intake member 110 actually a discharge). Regardless of the flow direction, housing 5 and the outer wall of cavity 10 act as a manifolding to circulate fluid that is drawn by propeller 9. Referring to FIG. 6 and FIG. 7, the diameter of propeller 9 and intake member 110 are equal to the diameter of, or generally span across the entire perforated bottom 117 of cavity 10. This creates a generally even flow of fluid through the entire volume of cavity 10. It will be appreciated that to create a flow of fluid through the entire volume of cavity 10, particularly when cavity 10 is full of frozen items, the pumping system in this embodiment must be powerful enough to create a column of fluid that can blast through the entire flood plane created within filled cavity 10. The specific design parameters needed to enable the pumping system (including, but not necessarily limited to the size of motor 60 and the size, shape, etc. of propeller 9) to create a desired flow of fluid through the entire volume of cavity 10, and through (around all surfaces of) the frozen items 30 loaded within cavity 10, will vary depending upon factors such as the size and shape of cavity 10, as well as desired load capability for cavity 10, and will be readily apparent to a person of ordinary skill in the art.

Figure 13:
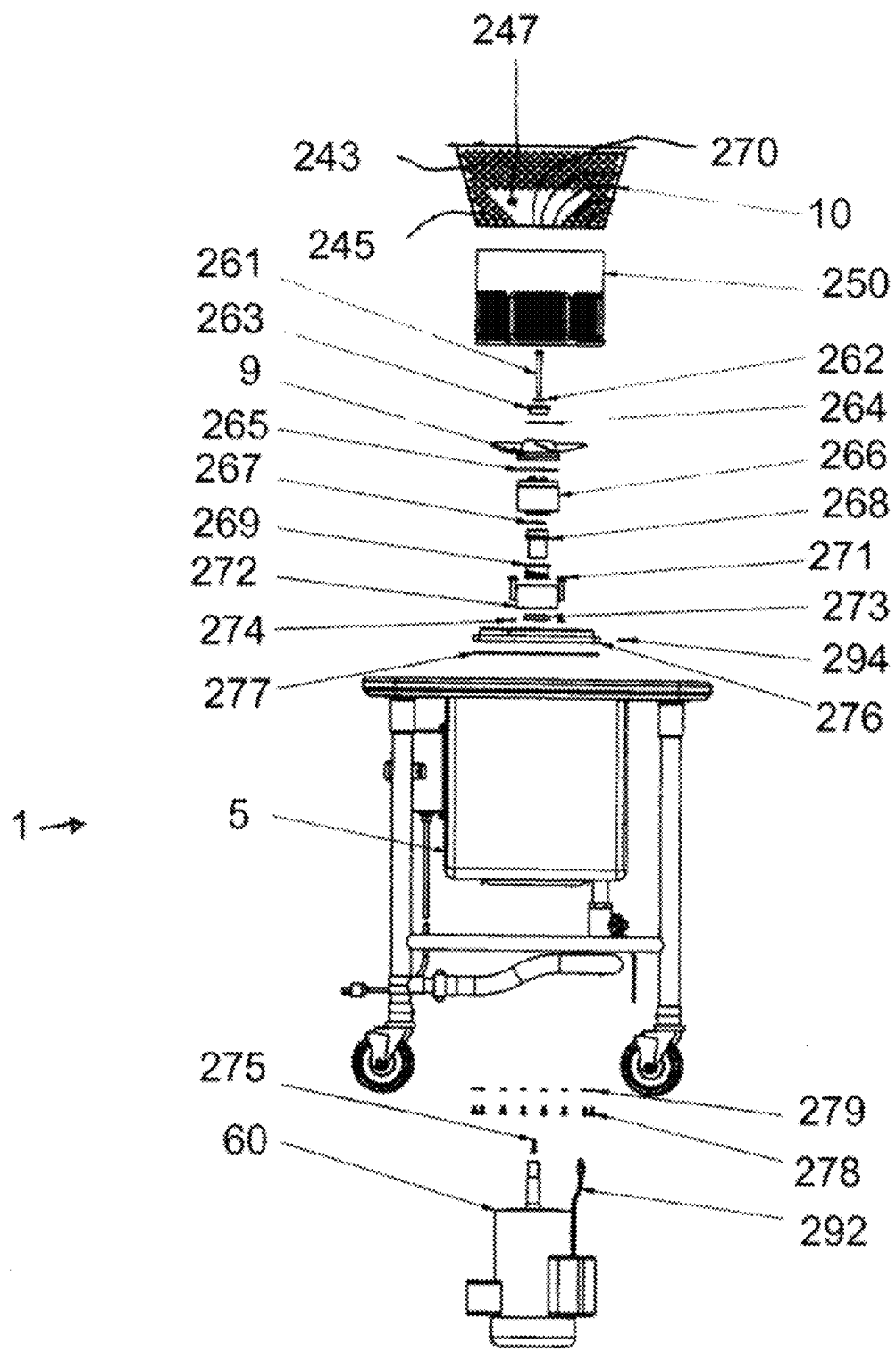
FIG. 13 is a front elevation exploded view of another embodiment of a defrosting system of the present general inventive concept similar to that of FIG. 9.
Figure 14:
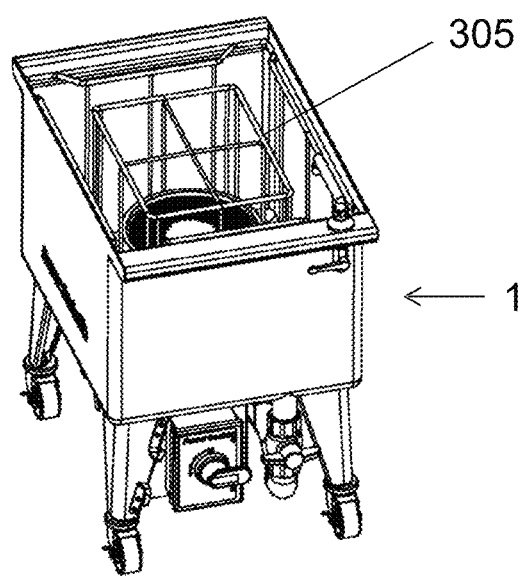
FIG. 14 is a top perspective view of a defrosting system of yet another embodiment of the present general inventive concept.

Referring to FIGS. 9 through 13 two similar variations of other embodiments of a defrosting system are shown. The defrosting system of FIGS. 9 through 12 is particularly well-suited for pulling defrosting fluid (water, etc.) downward through cavity 10 from/by propeller 9, while the system of FIG. 13 is particularly well-suited for pushing defrosting fluid upward through cavity 10. Nevertheless, it will be appreciated that in various embodiments the structure of FIGS. 9 through 12 will also be utilized in connection with a system in which fluid is pushed upward through cavity 10, and/or in connection with a system in which the direction of fluid flow is oscillated between forward and reverse directions (i.e. 10 minutes forward, then 10 minutes reverse, etc.) during a defrosting cycle to both push and pull fluid through cavity 10 by propeller 9. Likewise, it will be appreciated that in various embodiments the structure of FIG. 13 will also be utilized in connection with a system in which fluid is pulled downward through cavity 10, and/or in connection with a system in which the direction of fluid flow is oscillated between forward and reverse directions (i.e. 10 minutes forward, then 10 minutes reverse, etc.) during a defrosting cycle to both push and pull fluid through cavity 10 by propeller 9. It will also be appreciated that although the structures of the embodiments described in connection with FIGS. 1 through 8 are particularly well-suited for pulling fluid downward through cavity 10 by impeller/propeller 9, in some embodiments those structures will be utilized in connection with a system in which fluid is pushed upward through cavity 10, and/or in connection with a system in which the direction of fluid is oscillated between forward and reverse directions to both push and pull fluid through cavity 10.

As is shown in FIGS. 9 through 13, cavity 10 is removably positioned within housing 5 of defrosting system 1. Cavity 10, includes handles 215 for easy removal and reinsertion of cavity 10 within housing 5. This allows cavity 10 to be loaded with frozen items 30 prior to insertion into housing 5 of defrosting system 1. Cavity 10 includes perforations 243 and 245 located toward the upper and lower portions of the walls of cavity 10 respectively (discussed in further detail below). This creates two defrosting actions, in a situation in which the system is operating in an upward direction (i.e. pushing fluid upward through cavity 10 from propeller 9): 1) a first action is to push fluid up through (around all exposed surfaces of each of) the frozen items 30, as the fluid approaches the top of cavity 10 gravity reduces the upward velocity of the fluid and ultimately causes the fluid path to change from an upward to a downward direction and then the fluid ultimately is pulled through the perforations (243) located toward the top of cavity 10 to return to propeller 9 through the manifolding that is created by housing 5 and cavity 10; and 2) the second action is to pull fluid horizontally toward the side of cavity 10 through the perforations (245) located toward the lower end of cavity 10 (i.e. the velocity and/or direction of the flow of fluid is altered from generally vertical as it is discharged from the propeller 9, to generally horizontal), then through the manifolding to return to propeller 9. Similarly, in a situation in which the system is operating in a downward direction (i.e. by pulling fluid downward through cavity 10 by propeller 9): 1) a first action is to pull fluid downward through cavity 10 and through (around all exposed surfaces of each of) the frozen items 30, the fluid is then directed back upward through the manifolding and toward the top of cavity 10; and 2) the second action is to pull fluid horizontally from the manifolding toward the center of cavity 10 through the perforations (245). The second, horizontal action helps to eliminate or minimize any "dead zones" within cavity 10, resulting generally in a flow of fluid through the entire volume of cavity 10.

Figure 10:
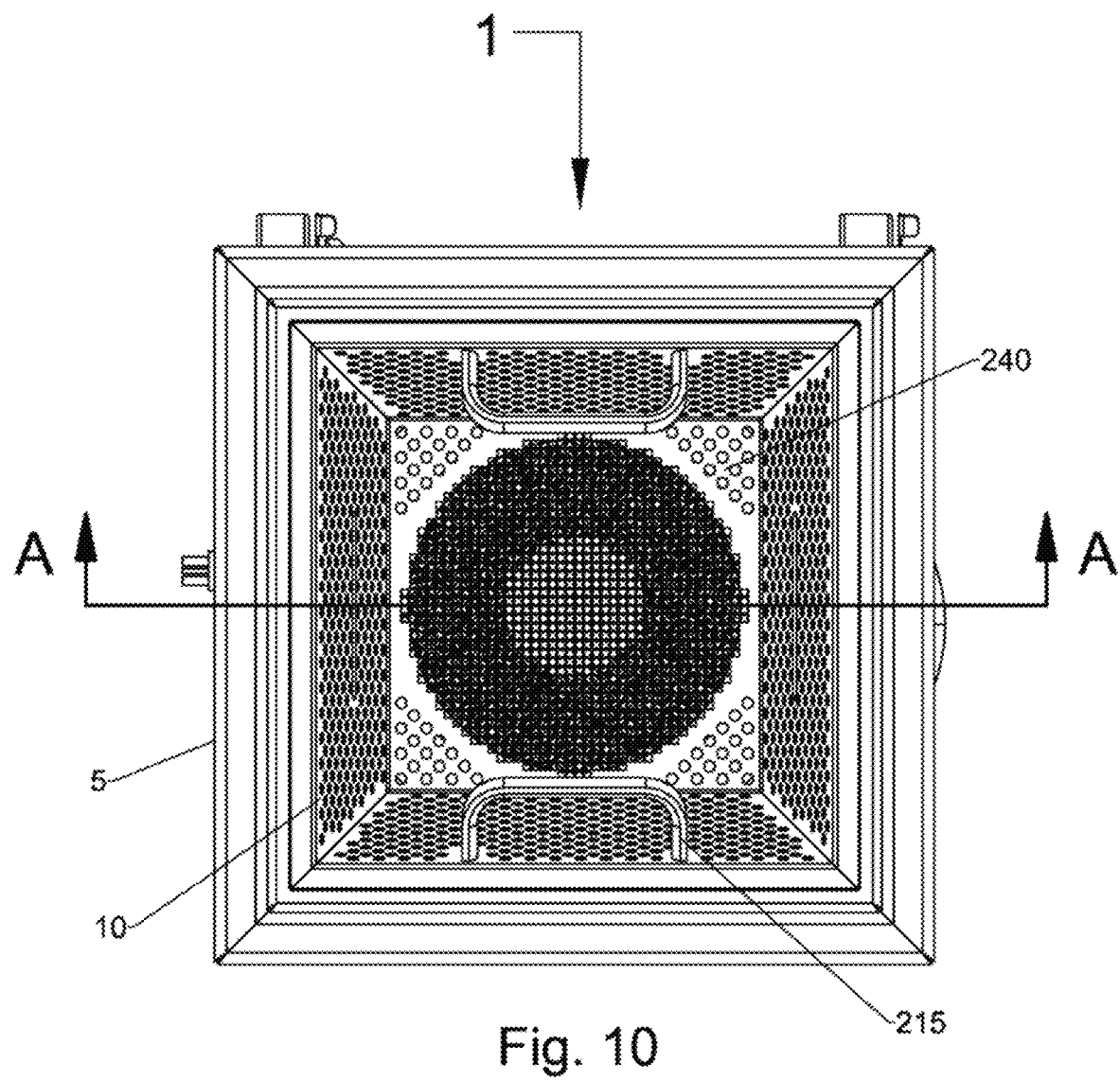
FIG. 10 is a top plan view of the defrosting system of FIG. 9.

As is shown in more detail in FIG. 10, cavity 10 includes a generally square or rectangular bottom. The square/rectangular bottom works well for loading frozen items 30 into cavity 10, due to the generally long and narrow rectangular/box shapes and sizes of those items. This shape allows generally a larger portion of the volume of cavity 10 to be filled with frozen items 30. Alternatively, if a rounded shape is used, similar to that shown in FIGS. 6 through 8, the frozen items 30 will tend to create a chord across the circular shape, and less items will be located outside the chord region than toward the center of the circle. Although the bottom of cavity 10 is square/rectangular, the opening at the bottom of cavity 10 is round in shape to mate with the shape of the rotational path of propeller 9, which pulls (or pushes) a generally circular column of fluid upward through cavity 10. This creates potential dead zones 240 at the corners of cavity 10, in which little or no vertical fluid flow will take place. As shown in FIG. 10, in the embodiment of FIGS. 9 through 12 perforations are located along the bottom corners of cavity 10 to push or draw fluid through the dead zones 240 in a generally vertical manner. The vertical draw is created by the draw force of propeller 9 of the pumping system when the system is operating in an upward manner (i.e. fluid is being pushed upward through cavity 10 by propeller 9). The vertical pushing force is created by the discharge of propeller 9 as it is directed upward by the manifolding of housing 5 when the system is operating in a downward manner (i.e. the fluid is being pulled downward through cavity 10 by propeller 9). Also, in both the embodiment shown in FIGS. 9 through 12 and that shown in FIG. 13, perforations 245 are included at the lower corners of cavity 10 to draw fluid through the dead zones 240 in a generally horizontal manner. This horizontal draw is created by the draw force of propeller 9 of the pumping system when the system is operating in both an upward and a downward manner.

As is shown in FIG. 13, perforations 243 are located generally evenly throughout the entire upper portion of the walls of cavity 10; while the lower portion of the walls includes perforations 245 only at the corners of cavity 10 and otherwise includes solid wall portions 247 away from the corners. As is shown by flow lines 270 in FIG. 13, this design allows for some horizontal linear flow through cavity 10 at the corners of cavity 10, while at the same time allowing for generally vertical linear flow through the majority of the volume of cavity 10. It will be appreciated that in various embodiments the perforation pattern of cavity 10 will be modified to optimize the desired flow path of fluid through cavity 10.

As is shown in both embodiments of FIGS. 11 and 13, cavity 10 has a generally tapered shape from top to bottom in which the top is generally wider in diameter than the bottom of cavity 10. The top of cavity 10 further includes an annular lip that surrounds housing 5 such that when cavity 10 is placed within housing 5 and the lip holds cavity 10 securely within housing 5. Cavity 10 is further supported within housing by shroud subassembly 250, on which the bottom of cavity 10 is placed and rests when cavity 10 is located within housing 5. The tapered shape of cavity 10, compared to the generally vertical walls of housing 5 create an open space or manifolding between the walls of cavity 10 and housing 5.

Referring to FIG. 13, an exploded view of the components to system 1 is shown. It will be appreciated that although similar components are capable of being used in both the embodiment shown in FIGS. 9 through 12 and that shown in FIG. 13, various differences in individual components will be desirable in some embodiments, particularly due to the fact that the embodiment of FIGS. 9-12 is particularly well-suited for pulling cleaning fluid (water/detergent, etc.) downward through cavity 10 from/by propeller 9, while the system of FIG. 13 is particularly well-suited for pushing cleaning fluid upward through cavity 10. For example, the orientation of propeller 9 is upside down in FIGS. 9-12 when compared to that of FIG. 13 to provide better flow in the preferred pulling direction. As a result, the size, shape and structural design of various components such as the impeller cap, seals and shaft extension all differ to accommodate the different orientation of propeller 9. Furthermore, the embodiment of FIGS. 9-12 includes a number of vertical panels arranged in a radial pattern directly below propeller 9 to assist the flow of fluid as it is discharged from propeller 9. The vertical panels aid in converting rotational energy from the propeller into a more linear flow of the fluid. Nevertheless, it will be appreciated that various other structures for assisting the flow of fluid through the system of the instant invention will be apparent to those of ordinary skill in the art upon learning of the instant inventive concept.

As is shown in FIG. 13, cavity 10, fits within housing 5 with the annular lip of cavity 10 surrounding the outer edge of the opening of housing 5 to support cavity 10 in position within housing 5. Cavity 10 further is supported in position within housing 5 by sitting on top of shroud subassembly 250, which surrounds propeller 9. Shroud subassembly 250 aids in restricting the flow path generated by propeller 9 through a generally solid-walled section that surrounds propeller. Fluid either enters (in a system in which propeller 9 pushes fluid upward into cavity 10) or is discharged from (in a system in which propeller 9 pulls fluid downward through cavity 10) shroud subassembly 250 through slots, holes or other openings located in shroud subassembly 250 generally below propeller 9. Propeller 9 is mounted to the shaft of motor 60 using cap screw 261, self sealing washers 262, impeller cap 263 and cap seal 264. The assembly for mounting propeller 9 to the shaft of motor 60 further includes quad ring 265, shaft extension 266, o-ring 267, pump shaft sleeve 268, rotating seal 269, cap screw 271, seal housing 272, fixed seal 273, quad ring 274, and cap screw 275. Motor 60 is mounted below housing 5 with the shaft extending into housing 5. Motor 60 is mounted to housing 5 using motor plate 276 and motor plate gasket 277 within housing 5; cap screw 275 and cap screws/hex bolts 278 and lock washers 279 are located below housing 5 to hold motor plate 276 in position. Pin 294 is located within a fluid drainage passageway into motor plate 276. Pin 294 closes off a horizontal portion of the passageway to direct fluid only through a vertical portion of passageway and out through tubing 292. This allows for drainage of any fluid that may push through the seals. Referring to FIG. 12, the mounting assembly of motor 60 (which is essentially the same for both the embodiment shown in FIGS. 9 through 11 and the embodiment shown in FIG. 13) is shown in further detail. As is shown in FIG. 12, motor 60 is mounted to housing 5 through the use of hex bolts 278 which extend through helical spring lock washers 279 below housing 5, through the bottom of housing 5, further through motor plate gasket 277 and into motor plate 276 located within housing 5. Housing 5 is supported by a leg assembly and caster wheels which allow system 1 to be a self-standing unit. A drain is located at the bottom of housing 5 to allow fluid to be drained from system 1. The drain is connected to drain tubing that includes a ball valve (or other suitable valve) for opening and closing the drain as desired.

In operation, cavity 10 of either the embodiment shown in FIGS. 9 through 12 or that of FIG. 13 is filled with frozen items 30 and placed within housing 5 which is filled with defrosting fluid. The level of defrosting fluid is preferably above the level of the mass of frozen items 30 located within the cavity. When either system is operated to push fluid up through cavity 10 by propeller 9, as fluid is pumped up from propeller 9 and into cavity 10, the upward force will push upward into the frozen items located within cavity 10. This will tend to cause the items to "float" and move slightly upward, around and/or apart from one another, thereby potentially increasing defrosting efficiency.

As is discussed above, to create the flow of fluid through the entire volume of cavity 10, particularly when cavity 10 is full of frozen items 30, the pumping system in this embodiment must be powerful enough to create a column of fluid that can blast through the entire flood plane created within filled cavity 10. In some embodiments shown in FIGS. 9 through 13, a pumping system capable of pumping roughly 9000 gallons of fluid per minute is utilized to create approximately a ten inch diameter by 10 inch high column of moving fluid within cavity 10. Nevertheless, it will be appreciated that either higher or lower capacity pumping systems will be utilized, depending upon the desired flow characteristics, load capacity, and other design considerations.

During operation of the pumping system of some embodiments, the entire volume of cavity 10 is continuously exchanging fluid as fluid flows through the pumping system and back through cavity 10. The column of fluid or flow of fluid through cavity 10 of such embodiments includes a cross section area that is at least equal to, and preferably greater than the cross-section area of the items being defrosted within cavity 10. Thus, the entire area of the items are exposed to the flow of fluid through cavity 10.

one embodiment of the instant invention, the primary components of system 1 described herein are all manufactured of stainless steel for durability and to prevent rusting. Nevertheless, it will be appreciated that any suitable materials for the various components may be utilized without departing from the spirit and scope of the instant invention.

Although shown and described herein as a single cavity, it will be appreciated that cavity 10 of the instant invention in some embodiments actually consist of multiple individual cavities or compartments within a single housing. In various embodiments such cavities or compartments will be arranged horizontally (i.e. stacked on top of one another) or vertically (i.e. located side by side of one another), or in any other arrangement desired. It will be appreciated that the singular term "cavity" as used herein and particularly as used in the appended claims, is intended to refer to one or more cavities or compartments. Furthermore, it will be appreciated that other singular terms (including, but not limited to "opening", "port", "perforation", "side", "wall", "intake", "discharge", "mass", "rack") as used herein, and particular as used in the appended claims, are intended to refer to one of more of such components.

In a preferred embodiment, motor 60 is a 110 volt motor providing increased flexibility over larger motors. It will be appreciated that in various embodiments other components will be included in system 1 without departing from the spirit and scope of the instant invention.

In yet another embodiment, the cavity 10 includes a basket 305. The basket is configured to restrain and/or space frozen items 30 within the cavity during the defrosting process. In one embodiment, the basket 305 is removable so that defrosting is capable of being accomplished with or without utilizing the basket 305. In another embodiment, a plurality of removable baskets 305 are provided so as to provide alternative restraining and/or spacing capabilities. In some embodiments, the cross-members of the frame are designed to create a clamping force against surfaces of the frozen items (e.g. the members are spaced apart less than a thickness of the item being held) to prevent the items from floating within the fluid. In other embodiments the members are spaced apart more than a thickness of the item(s) being held such that no clamping force is applied.

In some embodiments of the method of inventive concept, the control system measures/identifies a beginning temperature of the fluid within the cavity/tank of the defrost system before any frozen items are placed within the fluid. Nevertheless, it will be appreciated that in other embodiments the control system will measure/identify a beginning temperature of the fluid after frozen items are placed within the fluid.

In some embodiments in which the system first measures a beginning temperature before frozen items are added, the system will operate in a "standby" mode until a target temperature for the fluid is maintained. In some such embodiments, the system will also operate in "standby" mode until a target system fluid level is obtained. In some embodiments, once the system is in "ready" mode (e.g. target temperature is obtained and target fluid level is obtained) the frozen items are added to the fluid. In some embodiments, this is indicated to a system user via illumination of a "ready" light that notifies the user that items should be loaded into the system. In some embodiments, a pump is initiated in standby mode and/or in ready mode to introduce heat into the fluid created by the motion of the fluid, ambient room heat and/or operational friction and other ambient heat sources, until the fluid reaches the target temperature. In some embodiments, supplemental heat (e.g. from a heating element) is introduced into the fluid to in standby mode and/or in ready mode to introduce heat into the fluid. In some such embodiments, supplemental heat is introduced into the fluid to offset an initial temperature decrease that occurs as a result of frozen items being placed into the fluid immediately after a user loads such items. In some such embodiments, the supplemental heat is discontinued after an original beginning temperature and/or target temperature for the fluid is reached, and heat is introduced thereafter into the fluid through the motion of the fluid, ambient room heat and/or operational friction and other ambient heat sources. Once a predetermined "complete" temperature is reached in the fluid, a "complete" alert message is initiated indicating that the product is thawed and ready for removal from the fluid. The complete target temperature of the fluid is determined based upon various factors such as beginning temperature and/or beginning target temperature, fluid volume, estimated frozen load size, shape and temperature and thermodynamic properties and principles applied thereto. In some embodiments, when a second predetermined upper temperature set/target point is reached, the control system initiates a heightened "complete" alert message to alert the user that items are thawed and should be removed from the fluid.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described. For instance, it is understood that a variety of water flow machines, such as those described in the '436 Patent, the '496 Patent, the '534 Application, and the '984 Application, will in various embodiments be modified to accomplish the inventive systems and methods of the present invention.

Although the foregoing detailed description of the present invention has been described by reference to exemplary embodiments, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein (including, but not limited to any and all combinations of one or more components from one embodiment disclosed herein with one or more components from another embodiment disclosed herein or from other embodiments hereinafter developed). Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A defrosting system comprising:
a housing including a cavity for holding defrosting fluid and locating frozen items during operation;
a pumping system in fluid communication with the defrosting fluid, the pumping system being moveable between a standby configuration and an operating configuration, wherein the pumping system is configured to circulate defrosting fluid through said cavity and by said frozen items when the pumping system is in the operating configuration;
a control system in communication with the pumping system; and
a temperature sensor in data communication with the control system, the temperature sensor being configured to monitor the temperature of the defrosting fluid;
wherein the control system obtains a temperature reading from the temperature sensor,
wherein the control system comprises a plurality of logic structures for comparing the temperature reading to temperature ranges, the logic structures comprising:
a first logic structure for comparing the temperature reading to a first temperature range;
a second logic structure for comparing the temperature reading to a second temperature range if the temperature reading is outside of the first temperature range; and
a third logic structure for comparing the temperature reading to a third temperature range if the temperature reading is outside of the first and second temperature ranges
wherein the first temperature range is associated with a preferred operating temperature,
wherein the second temperature range has a maximum temperature value that is greater than a maximum temperature value of the first temperature range, and
wherein the third temperature range has a maximum temperature value that is greater than a maximum temperature value of the second temperature range.

2. The defrosting system of claim 1, further comprising a heater in thermal communication with the defrosting fluid, a fourth logic structure of the control system being configured to move the heater from an off configuration to an on configuration if the temperature reading is below the first temperature range, thereby causing the heater to transfer heat energy into the defrosting fluid.

3. The defrosting system of claim 1, further comprising a first indicator in data communication with the control system, the first logic structure of the control system being configured to move the first indicator from an off configuration to an on configuration if the temperature reading is within the first temperature range, thereby providing an indication to at least one of the control system and a user that the frozen items may be moved into the defrosting fluid.

4. The defrosting system of claim 3, further comprising a second indicator in data communication with the control system, the second logic structure of the control system being configured to move the second indicator from an off configuration to an on configuration if the temperature reading is within the second temperature range and above the maximum temperature value of the first temperature range, thereby providing an indication to at least one of the control system and a user that the temperature of the defrosting fluid should be reduced.

5. The defrosting system of claim 4, further comprising a third indicator in data communication with the control system, the third logic structure of the control system being configured to move the third indicator from an off configuration to an on configuration if the temperature reading is within the third temperature range and above the maximum temperature value of the second temperature range, thereby providing an indication to at least one of the control system and a user that at least some of the defrosting fluid should be replaced with defrosting fluid having a lower temperature.

6. The defrosting system of claim 5, further comprising a fourth indicator in data communication with the control system, a fourth logic structure of the control system being configured to move the fourth indicator from an off configuration to an on configuration if the temperature reading is above the maximum temperature value of the third temperature range, thereby providing an indication to a user that the items should be removed from the defrosting fluid.

7. The defrosting system of claim 1, further comprising an indicator in data communication with the control system, the second logic structure of the control system being configured to move the indicator from an off configuration to an on configuration if the temperature reading is within the second temperature range and above the maximum temperature value of the first temperature range, thereby providing an indication to at least one of the control system and a user that the temperature of the defrosting fluid should be reduced.

8. The defrosting system of claim 1, further comprising an indicator in data communication with the control system, a fourth logic structure of the control system being configured to move the indicator from an off configuration to an on configuration if the temperature reading is above the maximum temperature value of the third temperature range, thereby providing an indication to a user that the items should be removed from the defrosting fluid.

9. A method of utilizing a defrosting system to defrost items, the method comprising:
holding defrosting fluid within a cavity of a housing;
locating frozen items in the defrosting fluid;
moving a pumping system from a standby configuration to an operating configuration, thereby causing the pumping system to circulate defrosting fluid through the cavity and by the frozen items;
utilizing a temperature sensor to monitor the temperature of the defrosting fluid;
obtaining by a control system a first temperature reading from the temperature sensor;
comparing by the control system the first temperature reading to:
a first temperature range;
a second temperature range having a maximum temperature value that is greater than a maximum temperature value of the first temperature range; and
a third temperature range having a maximum temperature value that is greater than the maximum temperature value of the second temperature range; and
changing by the control system a configuration of the defrosting system based on the comparison of the first temperature reading to at least one of the first, second, and third temperature ranges.

10. The method of claim 9, wherein the defrosting system is changed from a standard configuration to a heating configuration if the first temperature reading is below a minimum temperature value of the first temperature range, wherein the defrosting system is moved to the heating configuration by the control system moving a heater of the defrosting system from a first configuration to a second configuration, thereby causing the heater to transfer heat energy to the defrosting fluid.

11. The method of claim 9, wherein the defrosting system is changed from a standard configuration to a cooling configuration if the first temperature reading is within the second temperature range and above a maximum temperature value of the first temperature range.

12. The method of claim 11, further comprising obtaining by the control system a second temperature reading from the temperature sensor and comparing the second temperature reading to the first temperature range, wherein the defrosting system is changed from the cooling configuration to the standard configuration if the second temperature reading is within the first temperature range.

13. The method of claim 9, wherein the defrosting system is changed to a fluid replacement configuration if the first temperature reading is within the third temperature range and above a maximum temperature value of the second temperature range.

14. The method of claim 9, wherein the defrosting system is changed to an alert configuration if the first temperature reading is above a maximum value of the third temperature range.

15. A method of defrosting items, the method comprising:
filling a cavity of a defrosting system with defrosting fluid;
obtaining a first temperature reading of the defrosting fluid while the defrosting system is in a standby mode;
comparing the first temperature reading to a first predetermined temperature range;
utilizing a control system of the defrosting system to move the defrosting system from the standby mode to a ready mode if the first temperature reading is within the first temperature range;
locating a frozen item within the cavity when the defrosting system is in the ready mode;
moving the defrosting system from the ready mode to a defrosting mode by developing a flow of defrosting fluid within the cavity so as to increase direct heat transfer between the frozen item and the defrosting fluid;
obtaining a second temperature reading of the defrosting fluid; and
comparing the second temperature reading to a second predetermined temperature range.

16. The method of claim 15, further comprising:
performing a cooling process for cooling the defrosting fluid if the second temperature reading is above a maximum value of the second predetermined temperature range,
wherein the cooling process comprises at least one of:
drawing heat energy from the existing defrosting fluid; and
adding new defrosting fluid to the existing defrosting fluid,
wherein the new defrosting fluid has an average temperature below the maximum value of the second predetermined temperature range.

17. The method of claim 16, wherein said cooling process comprises at least adding new defrosting fluid to the existing defrosting fluid, wherein at least some of the new defrosting fluid is frozen when it is added to the existing defrosting fluid.

18. The method of claim 15, further comprising:
comparing the second temperature reading to a third predetermined temperature range; and
adding heat to the defrosting fluid if the second temperature reading is below a minimum value of the third predetermined temperature range.

19. The method of claim 18, wherein heat is added to the defrosting fluid by moving a heater from a first configuration to a second configuration, thereby causing the heater to transfer heat energy to the defrosting fluid, the method further comprising:
obtaining a third temperature reading of the defrosting fluid while the heater is in the second configuration;
comparing the third temperature reading to the third predetermined temperature range;
moving the heater from its second configuration to its first configuration if the third temperature reading is within the third predetermined temperature range.

20. The method of claim 19, wherein the controller moves the heater between its first and second configurations.

* * * * *